United States Patent
Johns

(10) Patent No.: US 9,219,757 B2
(45) Date of Patent: Dec. 22, 2015

(54) MESSAGE CORRELATION

(75) Inventor: Kevin C. Johns, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 2819 days.

(21) Appl. No.: 11/646,982

(22) Filed: Dec. 28, 2006

(65) Prior Publication Data

US 2008/0162634 A1 Jul. 3, 2008

(51) Int. Cl.
*G06F 15/16* (2006.01)
*H04L 29/06* (2006.01)
*H04L 29/08* (2006.01)

(52) U.S. Cl.
CPC ............ *H04L 65/1006* (2013.01); *H04L 67/14* (2013.01); *H04L 67/146* (2013.01); *H04L 65/1016* (2013.01)

(58) Field of Classification Search
CPC .... H04L 67/14; H04L 67/146; H04L 65/1016
USPC .......................................................... 709/228
See application file for complete search history.

(56) References Cited

U.S. PATENT DOCUMENTS

| | | | |
|---|---|---|---|
| 6,334,114 B1 * | 12/2001 | Jacobs et al. ................. | 705/26.8 |
| 6,732,153 B1 * | 5/2004 | Jakobson et al. ............ | 709/206 |
| 7,653,933 B2 * | 1/2010 | Miao ................................. | 726/4 |
| 7,805,127 B2 * | 9/2010 | Andreasen et al. ........... | 455/408 |
| 8,024,470 B2 * | 9/2011 | Olson et al. .................... | 709/228 |
| 2002/0191623 A1 * | 12/2002 | Couturier et al. ............. | 370/401 |
| 2004/0102182 A1 * | 5/2004 | Reith et al. .................... | 455/410 |
| 2004/0186891 A1 * | 9/2004 | Panec et al. ................... | 709/206 |
| 2004/0205187 A1 * | 10/2004 | Sayal et al. .................... | 709/224 |
| 2005/0044194 A1 * | 2/2005 | Baldiga et al. ................ | 709/223 |
| 2005/0086297 A1 * | 4/2005 | Hinks ........................... | 709/203 |
| 2005/0117586 A1 * | 6/2005 | Ikeda et al. .............. | 370/395.21 |
| 2006/0047822 A1 * | 3/2006 | Willis ............................ | 709/228 |
| 2006/0212511 A1 * | 9/2006 | Garcia-Martin .............. | 709/203 |
| 2008/0013447 A1 * | 1/2008 | Lauber ........................... | 370/225 |
| 2008/0089344 A1 * | 4/2008 | Jansson et al. ............. | 370/395.2 |
| 2008/0151918 A1 * | 6/2008 | Foti .............................. | 370/410 |

\* cited by examiner

*Primary Examiner* — Douglas Blair
(74) *Attorney, Agent, or Firm* — Great Lakes Intellectual Property, PLLC.

(57) ABSTRACT

Message correlation wherein messages from multiple network elements may be correlated as a function of correlation IDs included within the messages. The correlation IDs may be determined independently by each network element and in a stateless manner. The correlation IDs may be unique for each session and determined from unique dialog information included within messages used to the support the session.

19 Claims, 1 Drawing Sheet

MESSAGE CORRELATION

BACKGROUND OF THE INVENTION

1. Field of the Invention

The present invention relates to message correlation of the type wherein one or more messages originating from a network element require correlation with messages originating from other network element.

2. Background Art

The 3rd Generation Partnership Project (3GPP) IP Multimedia Subsystem (IMS) architecture, and other similar architectures, define protocols and interfaces that support accounting mechanisms. These accounting mechanisms allow a network operator and/or service provider to gather information related to a particular session from various network elements. This information may include things such as when a session began and ended, when QoS resources were reserved, committed and released, when a particular feature was invoked, etc.

Such an accounting mechanism requires the ability to correlate the different messages generated by separate network elements so that a complete record about a particular set of related events can be viewed together. 3GPP IMS requires that a particular network element create a unique identifier (called a correlation ID), and then pass that identifier to each network element involved in the session so that they all use the same identifier when reporting accounting events. This mechanism requires that the network element generating the correlation ID retain this information across an entire session, which increases memory and other processing demands on the network elements.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
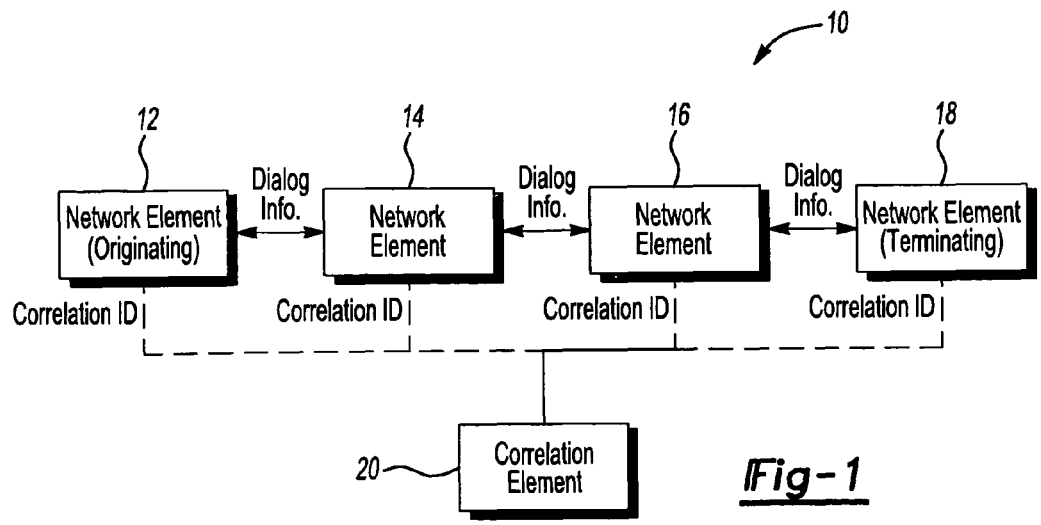
FIG. 1 illustrates a networking system in accordance with one non-limiting aspect of the present invention.

FIG. 1 illustrates a networking system 10 in accordance with one non-limiting aspect of the present invention. The system 10 may include a number of network elements 12-18 to facilitate session based operations. The session based operations may relate to any number of operations and/or applications associated with electronic communications between an originating network element 12 and a terminating network element 18. Optionally, one or more intermediary network elements 14-16 may be used for supporting communications and/or performing other operations associated with the session.

The session based operations generally relate to any endeavor where multiple network elements 12-18 establish a session dialog to facilitate signaling and processing activities required of each network element 12-18 to support the desired application. The session may be used to support any number of activities, such as but not limited to VoIP calls, multimedia distribution, multimedia conferences, and others.

Session initiated protocol (SIP) is one protocol commonly used to support session based operations. As noted in the latest SIP specification (RFC 3261) provided by Internet Engineering Task Force (IETF), there are many applications of the Internet that may require the creation and management of a session, where a session is considered an exchange of data between an association of network elements. Numerous protocols have been authored that carry various forms of real-time multimedia session data such as voice, video, or text messages. SIP may operate in concert with these protocols by enabling Internet endpoints (network elements, agents, etc.) to discover one another and to agree on a characterization of a session they would like to share. For locating prospective session participants, and for other functions, SIP enables the creation of an infrastructure of network hosts (called proxy servers) to which user agents can send registrations, invitations to sessions, and other requests. SIP is an agile, general-purpose tool for creating, modifying, and terminating sessions that works independently of underlying transport protocols and without dependency on the type of session that is being established.

While the present invention is predominately described with respect to SIP based sessions, the present invention is not intended to be so limited and fully contemplates its use and application with any number of applications, standards, and protocols. For exemplary purposes, the present invention is also predominately described with respect to supporting VoIP calls and related activities. The present invention, however, is not intended to be so limited and fully contemplates its use with any number of applications and activities, and not just VoIP relates activities.

VoIP calls and other session based applications may rely on the network elements 12-18 to process and otherwise communicate signals. Information relating to accounting, performance, quality of service, when a session began and ended, when QoS resources were reserved, committed and released, when a particular feature was invoked, etc. and other data may need to be collected from the network elements 12-18 associated with supporting the session.

The system may include a correlation element 20 to facilitate collecting and processing this and other information from the network elements 12-18. For example, the correlation element may include capabilities to function as an accounting element whereby the network elements 12-18 may be configured and/or instructing to provide accounting information to the correlation element 20 upon occurrence of an accounting event, such as but not limited to accounting events associated with billing a customer for making a VoIP call.

Accounting messages or other messages may be used to communicate information relevant to tracking accounting and other activities of the network elements 12-18. Because the correlation element 20 may be required to track multiple sessions and activities of multiple network elements, a unique correlation ID may be included with messages to facilitate identifying the relevant session. Each session may include a unique correlation ID that the correlation element 20 can use to match or otherwise group messages relevant to a particular session. The correlation element 20 may then process the matched messages or forward them to another element to facilitate assessing the session and activities of the network elements.

The network elements 12-18 may be used to support multiple sessions for any number of activities. This may require the network elements 12-18 to process any number of signals and exchanges messages with the other network elements 12-18 and correlation element 20. The network elements 12-18 may be configured to determine the correlation ID for each session and/or it may be provided to the network elements 12-18. Optionally, the network elements 12-18 may determine the correlation ID each time messages requiring the IDs are needed, rather than having to retain the correlation ID for a period of time. This can be helpful in limiting memory storage demands on the network elements 12-18. Moreover, the ability to determine the correlation ID, instead of recalling it from memory, may be helpful in enabling failover and scaling mechanisms whereby network elements 12-18 may be upgraded, removed, and/or added to the system without requiring prior knowledge of the correlation ID.

With SIP and other session formats, a session dialog may be established between the network elements 12-18 supporting a session. The session dialog may include dialog information associated with specifying any number of parameters and characteristics for the session. This information may be used to support messaging, communications, and other operations for the network elements 12-18.

With respect to SIP, for example, the session dialog may include, amongst other information, a To tag, From tag, and CALL-ID information that is passed with messages between the network elements 12-18, as one skilled in the art will appreciate. These pieces of dialog information may be determined by the network elements 12-18 when establishing the session and thereafter consistently used to facilitate messaging associated with supporting the session. Different dialog information may be determined for each session such that each session may include a unique set of dialog information.

The network elements 12-18 may be configured or otherwise instructed to determine unique correlation IDs for each session as a function of the dialog information. The resulting correlation ID, as result of the dialog information being unique for each session, is itself unique to the session. Hashing or other algorithms may be used to process the dialog information into a fixed or non-fixed length variable such that network elements, regardless of the dialog, may communicate messages having common fixed length correlation IDs. This may be helpful in correlating messages for any number of dialog types, as the resulting correlation ID may be independent of the protocol or information structure used to support the session.

Figure 2:
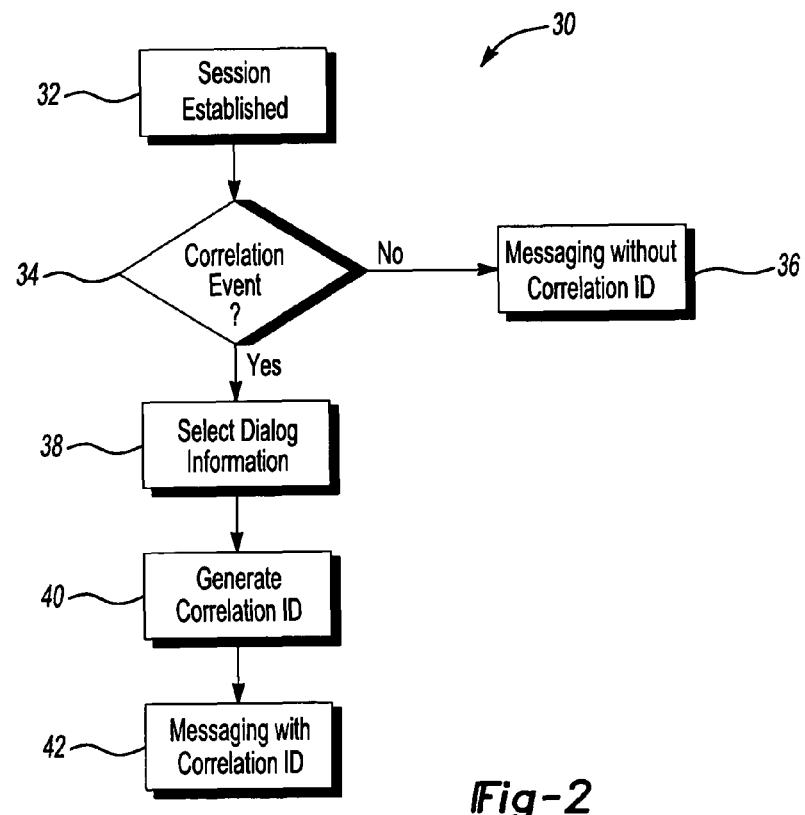
FIG. 2 illustrates a flowchart of a method of generating correlation IDs in accordance with one non-limiting aspect of the present invention.

FIG. 2 illustrates a flowchart 30 of a method of generating correlation IDs in accordance with one non-limiting aspect of the present invention. The method may be executed in coordination with the system described above and/or in any number of other environments where session based communications between multiple network elements are required. The method generally relates to determining unique correlation IDs for each session so as to facilitate message tracking and other operations. Optionally, the method may include the network elements determining the correlation IDs in a stateless manner and/or without communication of the correlation IDs from one network element to another.

Block 32 relates to establishing a session. As noted above, the session may relate to any exchange of information between multiple network elements where the network may need to agree on communication protocols, addressing, and the like. Optionally, the session may be established by one or more of the network elements upon communication of a sufficient number of messages or other signaling. The session may include a session dialog. The session dialog may include a core set of information that is generated for each session and used throughout the session, such as but not limited to a SIP session dialog having a To tag, From tag, and CALL-ID.

Establishment of the session may require multiple communications between the network elements. Each network element may be required to independently assess the session and to perform any number of operations in order to facilitate the operations associated therewith. This may include the network elements each optionally storing and retaining the dialog information used to direct the session. The dialog information, such as but not limited to the To tag, From tag, and call-ID, may be added to some or all of the messages communicated between each network element, as one having ordinary skill in the art will appreciate.

Block 34 relates to determining occurrence of a correlation event. The correlation event may relate to any number of events associated with one or more of the network elements transmitting messages for correlation with messages from the other network elements associated with a common or related session. For example, the correlation events may relate to accounting events in response to which the network elements communicate accounting messages to an accounting element, which the accounting element may then correlate and use for executing billing and other related activities. Of course, the correlation event need not be limited to accounting related events, as the correlation events are contemplated to include any event necessitating use of the correlation ID.

The network element may be configured to assess occurrence of a correlation event as function of any number of operating conditions. One such condition may correspond with receipt of messages from one or more of the other network elements. This may include reviewing the message to determine a related session and taking further action as a function thereof. The further action may include communicating messages to other network elements and/or a correlation element or other feature. The message to be communicated and its destination may be analyzed by the network element for use in determining when to include the correlation ID therewith, i.e. whether a correlation event has occurred.

Block 36 relates to determining a non-correlation event and communicating messages from the network element without the correlation ID. This may include the network element independently, i.e. without instruction from the other network elements, interrogating received messages or otherwise taking action the requires messages to be sent to another element without the need for the correlation ID. The messaging may be associated with supporting the application or operation for which the session is established and/or any number of other types of messaging required during operation of the network elements.

Block 38 relate to determining a correlation event and the need to determine or generate a correlation ID in order to support the desired messaging. Block 38 may include selecting one or more piece of dialog information for use in generating the correlation ID. The piece of dialog information may correspond with dialog information that is consistently used throughout the session, such as but not limited to one or more of the To tag, From tag, and CALL-ID. Each of the network elements may be configured to select the same piece or pieces of information. Optionally, the selected information may be of the type that is carried in each message that prompts communication of additional messages requiring the correlation ID.

Block 40 relates to generating the unique correlation ID as a function of the selected dialog information. The correlation ID may be generated according to any number of algorithms, cryptography, hashing, or other processing. Optionally, the processing may be of the type that results in a fixed length variable such that the inputted dialog information need not be of a fixed length in order to generate a fixed length variable. This may be helpful in facilitating use of the correlation ID across multiple protocols and standards.

The network element may be programmed or otherwise configured to independently generate the unique correlation ID for the same session. In this manner, the network element need not store the correlation ID throughout the session. The network elements may operate in a stateless manner such that the correlation ID is determined each time message requiring the same is needed. Optionally, rather than each of the network element generating the correlation ID, a lead network element may generate the correlation ID and pass it along to the other network elements as needed and/or for storage thereon.

Block 42 relates to communicating messages from the network element with the correlation ID. This may include attaching or otherwise associating the correlation ID with messages requiring the same. The correlation ID may travel with the message or in synchronization therewith such that the receiving entity may process or otherwise correlate the associated message as a function of the related correlation ID. The process described above may be repeated each time the network elements desire use of the correlation ID such that the correlation ID need not be stored on the network elements. Rather, it may automatically determined from information normally included within messages communicated between the network elements.

As described above, one non-limiting aspect of the present invention relates to generating correlation IDs. Instead of creating and storing a correlation ID, network elements can use the contents of the signaling messages to automatically create a globally unique correlation ID whenever an event needs to be reported. This method may be employed on all of the network elements. Alternately, in a 3GPP IMS environment or any similar environment, this method may be used only on the network element responsible for creating the correlation ID. In such an environment, that network element may still be responsible for passing the correlation ID to other components in the network. This allows for compatibility between the existing IMS method and the method described herein.

Applying this method to SIP, the correlation ID may be created using information contained in the Dialog (To tag, From tag, and Call-ID from RFC3261). The dialog generally remains constant across a session, and is designed to be globally unique so the same correlation ID can be calculated for each message with a extremely low risk of duplication of a correlation ID across sessions. The challenge with this approach is the variable length aspect of the dialog ID. This makes it difficult to know in advance how much space to retain in the accounting protocol for the correlation ID. The present invention addresses this short coming by converting the selected dialog information to a fixed length value. Several algorithms may be used in order to calculate the same fixed length output while still ensuring a reasonably unique value (e.g. a HASH). In cases where the dialog may change, this method may still be used, as correlation can occur by linking the old correlation ID and the new correlation ID in the accounting mechanism.

One non-limiting aspect of the present invention optimizes how accounting is performed in event based IP systems. By optionally not requiring the storage of a correlation ID, accounting mechanisms and elements can be used in environments where network elements are session stateless (i.e. they do not store information across sessions).

One non-limiting aspect of the present invention can be used to support the goal of having session stateless network architecture. Such an architecture may be valuable because it enables various failover and scaling mechanisms that are not available to architectures that require network elements to store information about specific active sessions.

One non-limiting aspect of the present invention relates to a method for creating a unique identifier in a session stateless environment (i.e. session information is not stored in intermediate servers). This identifier can be used for correlating accounting messages for the purposes of billing, network management, resource management, etc.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of generating a unique correlation ID for network based sessions, the method comprising:
   determining session dialog information uniquely created for each session established between multiple network elements, the session dialog information defining one or more parameters for messaging communicated during each session;
   processing the parameters defined in the session dialog information to generate a unique correlation ID for each session; and
   generating the correlation ID in a stateless manner that includes the network elements processing the parameters defined in the session dialog information to determine the correlation ID each time the correlation ID is needed for messaging communicated during each session.

2. A method of generating a unique correlation ID for network based sessions, the method comprising:
   determining session dialog information uniquely created for each session established between multiple network elements, the session dialog information defining one or more parameters for messaging communicated during each session;
   processing the parameters defined in the session dialog information to generate a unique correlation ID for each session such that each network element independently generates the unique correlation ID.

3. The method of claim 2 further comprising each network element independently hashing the parameters to generate the same correlation ID for the same sessions.

4. The method of claim 2 wherein session initiated protocol (SIP) defines the parameters for the dialog information of each session such that the correlation ID is generated as a function of processing information included within a SIP dialog.

5. The method of claim 4 further comprising generating the correlation ID as a function of at least one of a To tag, From tag, or Call ID information associated with the SIP dialog.

6. The method of claim 2 further comprising preventing the network elements from storing correlation IDs such that the network elements are required to generate correlation IDs each time correlation IDs are desired.

7. The method of claim 2 further comprising configuring the network elements to generate the correlation ID without receipt of the correlation ID from one of the other network elements.

8. The method of claim 2 further comprising configuring the network elements to hash the parameters defined in the session dialog information such that the correlation IDs are generated as a fixed length variable.

9. The method of claim 2 further comprising including the correlation ID within accounting messages communicated from the network elements to an accounting element, the correlation ID suitable for use by the accounting element in matching the messages element from the network elements.

10. The method of claim 9 further comprising including the correlation ID in messages to the accounting element and not messages to the other network elements.

11. The method of claim 9 further comprising configuring the accounting element to link multiple correlation IDs upon receipt of multiple correlations IDs for related sessions.

12. The method of claim 9 further comprising preventing the accounting element and any other entity from providing correlation IDs to the network elements for storage and use thereafter in subsequent messaging communicated during the sessions.

13. A method of creating a correlation ID for use in correlating messages generated by different network elements used to support a session initiated protocol (SIP) session, the SIP session including a dialog between the network elements that relies on a To tag, From tag, and Call ID to facilitate communications, the method comprising:
 generating the correlation ID as a function of at least one of the To tag, From tag, or Call ID, wherein the network elements generate the correlation ID in a stateless manner, requiring the network elements to generate the correlation ID each time the correlation ID is needed for messaging.

14. The method of claim 13 further comprising generating the correlation ID as a fixed length variable by hashing the at least one of the To tag, From tag, or Call ID.

15. The method of claim 13 further comprising generating the correlation ID each time the correlation ID is needed such that the at least one of the To tag, From tag, and Call ID is input each time as an input to an algorithm used to generate the correlation ID.

16. A system for supporting Voice over Internet Protocol (VoIP) calls where each call is conducted using a session established between a calling endpoint and a called endpoint, the system comprising:
 an accounting element in communication with the endpoints, the accounting element generating billing for each VoIP call according to billing messages received from the endpoints; and
 wherein the endpoints exchange messages in order to establish sessions for the VoIP calls, the exchanged messages resulting in defined session parameters that define communications between the endpoints for each session while VoIP calls are being conducted;
 wherein the endpoints generate unique correlation IDs for each session by processing the session parameters defined by the messages exchanged between the endpoints to establish the sessions; and
 wherein the endpoints include correlation IDs in each billing messages sent to the accounting element, the endpoints processing the session parameters to determine the correlation ID anew for each billing messages sent to the accounting element.

17. The system of claim 16 wherein the correlation ID is generated each time the correlation ID is needed.

18. The system of claim 16 wherein the session are defined according to session initiated protocol (SIP) and the correlation IDs are generated from processing a To tag, From tag, and CALL ID of each session into a fixed length variable.

19. The system of claim 16 wherein the accounting element does not communication correlation IDs to the endpoints, the endpoints do not store the correlation IDs, and the endpoints hash the session parameters anew for each billing message.

* * * * *